United States Patent
Li et al.

(10) Patent No.: US 12,147,352 B2
(45) Date of Patent: Nov. 19, 2024

(54) DYNAMIC TUNING OF LARGER PAGES DURING RUNTIME

(71) Applicant: INTERNATIONAL BUSINESS MACHINES CORPORATION, Armonk, NY (US)

(72) Inventors: Naijie Li, Beijing (CN); Dong Hui Liu, Beijing (CN); Jing Lu, Beijing (CN); Peng Hui Jiang, Beijing (CN); Xiao Yan Tang, Beijing (CN); Bao Zhang, Beijing (CN); Yong Yin, Beijing (CN); Jun Su, Beijing (CN); Jia Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 17/970,122

(22) Filed: Oct. 20, 2022

(65) Prior Publication Data

US 2024/0134805 A1    Apr. 25, 2024
US 2024/0232098 A9    Jul. 11, 2024

(51) Int. Cl.
*G06F 12/00*      (2006.01)
*G06F 12/1027*    (2016.01)
*G06F 13/00*      (2006.01)
*G06N 20/00*      (2019.01)

(52) U.S. Cl.
CPC .......... *G06F 12/1027* (2013.01); *G06N 20/00* (2019.01); *G06F 2212/684* (2013.01)

(58) Field of Classification Search
CPC .......... G06F 12/1027; G06F 2212/084; G06N 20/00
USPC .......................................................... 711/207
See application file for complete search history.

(56) References Cited

U.S. PATENT DOCUMENTS

| | | | |
|---|---|---|---|
| 6,804,754 B1 * | 10/2004 | Franaszek | G06F 12/08 711/159 |
| 9,501,422 B2 * | 11/2016 | Baskakov | G06F 9/45558 |
| 9,672,355 B2 * | 6/2017 | Titonis | H04W 12/12 |
| 10,474,580 B2 * | 11/2019 | Coburn | G06F 12/0868 |
| 11,526,508 B1 * | 12/2022 | McCallie, Jr. | G06F 40/284 |
| 2009/0119477 A1 * | 5/2009 | Plondke | G06F 12/1027 711/E12.002 |

(Continued)

FOREIGN PATENT DOCUMENTS

CN            114020416         2/2022

OTHER PUBLICATIONS

Cao et al., "Efficient Huge Page Management with Xpage", 2021 IEEE International Conference on Big Data (Big Data), 2021; pp. 1317-1326.

(Continued)

*Primary Examiner* — Sheng Jen Tsai
(74) *Attorney, Agent, or Firm* — Jared Chaney; Andrew D. Wright; Calderon Safran & Wright P.C.

(57) ABSTRACT

A method, including: identifying static application features of an application; identifying resource access features of the application; labeling a translation lookaside buffer (TLB) miss threshold of a runtime feature of the application; determining utilization of larger pages during the runtime based on the TLB miss threshold; and setting the TLB miss threshold based on the determined utilization of the larger pages.

20 Claims, 9 Drawing Sheets

(56) References Cited

U.S. PATENT DOCUMENTS

| | | | | |
|---|---|---|---|---|
| 2015/0363325 | A1* | 12/2015 | Baskakov | G06F 12/12 |
| | | | | 711/173 |
| 2015/0363326 | A1* | 12/2015 | Baskakov | G06F 12/12 |
| | | | | 711/173 |
| 2016/0026392 | A1* | 1/2016 | Harris | G06F 3/0604 |
| | | | | 711/171 |
| 2016/0098207 | A1* | 4/2016 | Guo | G06F 3/0641 |
| | | | | 711/154 |
| 2017/0270424 | A1* | 9/2017 | Sankaralingam | G06F 8/443 |
| 2021/0004437 | A1* | 1/2021 | Zhang | G06F 40/205 |
| 2021/0213973 | A1* | 7/2021 | Carillo Peña | B60W 60/0011 |
| 2021/0256435 | A1* | 8/2021 | Palmer | G06Q 30/0201 |
| 2021/0350175 | A1* | 11/2021 | Chauhan | G06F 18/214 |
| 2021/0374831 | A1* | 12/2021 | Hudson | G06N 5/04 |
| 2021/0390778 | A1* | 12/2021 | Kim | G06N 3/084 |
| 2022/0028037 | A1* | 1/2022 | Skaljak | G06T 5/70 |
| 2022/0068013 | A1* | 3/2022 | Kozlowski | G06T 15/80 |
| 2022/0075734 | A1* | 3/2022 | Pape | G06F 12/1027 |
| 2022/0116408 | A1* | 4/2022 | Healy | H04L 63/1425 |
| 2022/0188556 | A1* | 6/2022 | Cho | G06V 10/82 |
| 2022/0198011 | A1* | 6/2022 | Kumar | G06F 21/554 |
| 2022/0391818 | A1* | 12/2022 | Palmer | G06Q 10/06393 |
| 2023/0100142 | A1* | 3/2023 | Karimibiuki | G06N 7/02 |
| | | | | 726/25 |
| 2023/0376823 | A1* | 11/2023 | Sathaye | G16H 20/00 |
| 2023/0419176 | A1* | 12/2023 | Wang | G06N 20/00 |

OTHER PUBLICATIONS

Khambalkar et al., "HeronEye: Survey on Coordinated and Efficient Huge Page Management to Fine-grained OS Support", 2021 6th International Conference for Convergence in Technology (I2CT), Apr. 2-4, 2021; 7 Pages.

Guo et al., "SmartMD: A High Performance Deduplication Engine with Mixed Pages", Proceedings of the 2017 USENIX Annual Technical Conference (USENIX ATC '17), Jul. 12-14, 2017; pp. 733-744.

Sun et al., "Automated Performance Modeling Based on Runtime Feature Detection and Machine Learning", 2017 IEEE International Symposium on Parallel and Distributed Processing with Applications and 2017 IEEE International Conference on Ubiquitous Computing and Communications (ISPA/IUCC), 2017; pp. 744-751.

Amit, "Optimizing the TLB Shootdown Algorithm with Page Access Tracking", 2017 USENIX Annual Technical Conference (USENIX ATC '17), Jul. 12-14, 2017; pp. 27-39.

Li et al., "Thinking about A New Mechanism for Huge Page Management", APSys '19, Aug. 19-20, 2019; pp. 40-46.

* cited by examiner

DYNAMIC TUNING OF LARGER PAGES DURING RUNTIME

BACKGROUND

Aspects of the present invention relate generally to heap memory management during runtime of applications and, more particularly, to dynamic use of larger pages during runtime of applications.

Use of larger pages in heap memory management is often provided as a solution for high performance computing applications or memory-access intensive applications using large amounts of virtual memory. However, larger pages implementation normally requires particular implementation methods that do not allow for dynamic tuning of its use. Larger pages include huge pages on Linux systems, superpages in FreeBSD, and large pages on other mainframe systems. Although the below descriptions may use huge pages or large pages as examples, these specific descriptions are simply examples of larger pages and may be interchangeable. Huge pages allow the use and definition of 1 GB page sizes rather than a standard page size of 4 KB. Huge pages reduce operating system (OS) maintenance of page states by reducing the number of pages that are loaded by the kernel. For example, when small page sizes are used, the kernel needs to load more pages thus resulting in more overhead with access and maintenance of mapping between virtual memory and physical addresses. Further, use of huge pages increases translation lookaside buffer (TLB) cache hit ratios, where the TLB cache is an address-translation cache storing recent translations of virtual memory to physical memory. The TLB cache hit ratio is a percentage of times that a page number is found in the address-translation cache. Utilizing larger pages will result in lower miss rates and subsequently higher hit rates because the page size utilizes a larger virtual memory range for mapping the virtual memory to physical memory addresses and the TLB cache can access memory quicker when more memory is mapped in a single page. These larger page sizes benefit the overall system performance with less load on the kernel, and oftentimes, especially in memory-access intensive applications, more efficient use of virtual memory. This can benefit the application being run on the OS.

There are multiple ways to setup and use larger pages including reservation of larger pages and the use of transparent huge pages (THP). Reserving larger pages allocates a large number of memory pages with a consecutive physical address for these reserved larger pages. However, reserved pages can only be used with larger page allocations and must be pre-allocated for application use. This reserving is done through code added to the application being run on the OS and is a way to setup the use of larger pages that is inflexible.

Additionally, utilizing THP is an abstraction layer that automates creating, managing, and use of huge pages. On a system with THP, when a page fault occurs, THP tries to find a block with 512 contiguous physical pages (2 MB) in a buddy system. However, as the system ages, there will be many fragments in memory space, thus THP has to enable time-consuming memory compactions to create a huge page. In extreme cases, where the compaction operation fails due to unmovable pages, THP can only return a basic 4 KB page but will result in a long latency between the call and return due to accessing large amounts of fragmented memory.

Other issues with both larger pages and THP include memory bloating. For example, if only a small amount of memory is used, but an allocation of a huge page memory is used, then a large amount of memory goes unused and is wasted. In this situation, it becomes necessary to monitor and be aware of huge page utilization at runtime as memory bloating wastes a large amount of memory. In cases where memory is limited, huge pages can be turned off dynamically and then other applications can use the huge pages. Flexible and dynamic memory mechanisms adapt the appropriate policy according to the workload patterns and memory system's status at runtime. Thus, many of the disadvantages of use are related to the inflexibility of larger pages utilization.

SUMMARY

In a first aspect of the invention, there is a computer-implemented method including: collecting, by a processor set, a runtime feature during runtime of an application; labeling, by the processor set, a translation lookaside buffer (TLB) miss threshold of the runtime feature of the application; determining, by the processor set, utilization of larger pages during the runtime based on the TLB miss threshold; and setting, by the processor set, the TLB miss threshold based on the determined utilization of the larger pages. In this manner, implementations of the invention advantageously provide for a more efficient utilization of larger pages by selecting a TLB miss count that better manages the heap.

In further aspects of this invention, the method further including: determining the TLB miss threshold using a machine learning (ML) model; and dynamically tuning the utilization of the larger pages using the TLB miss threshold, the ML model being trained based on static application features and resource access features of another application. In this manner, implementations of the invention advantageously provide for an ML model that determines more efficient TLB miss threshold settings during runtime of an application. In another aspect of this invention, the method further including: identifying static application features of the application; vectorizing the static application features; and training the ML model with the vectorized static application features. In this manner, implementations of the invention advantageously provide for training data that is more easily digestible for the ML model.

In another aspect of the invention, there is a computer program product including one or more computer readable storage media having program instructions collectively stored on the one or more computer readable storage media. The program instructions are executable to: identify static application features of an application; identify resource access features of the application; label a translation lookaside buffer (TLB) miss threshold of a runtime feature of the application; and determine utilization of larger pages during the runtime by training a machine learning (ML) model based on the labeled TLB miss threshold, the static application features, and the resource access features. In this manner, implementations of the invention advantageously provide for a training of an ML model using labeled TLB miss counts (that act as a TLB miss threshold) to train the ML model to determine more efficient TLB miss threshold settings.

In further aspects of this invention, the computer program product further including dynamically tuning the utilization of the larger pages by applying the ML model. In this manner, implementations of the invention advantageously provide for an ML model that determines more efficient TLB miss threshold settings during runtime of an application. In another aspect of this invention, the computer program product further including: vectorizing the static application features; and train the ML model with the vectorized static application features. In this manner, implementations of the invention advantageously provide for training data that is more easily digestible for the ML model.

In another aspect of the invention, there is system including a processor set, one or more computer readable storage media, and program instructions collectively stored on the one or more computer readable storage media. The program instructions are executable to: identify static application features of an application; identify resource access features of the application; collect a runtime feature during runtime of the application; label a translation lookaside buffer (TLB) miss threshold of the runtime feature of the application; dynamically tune utilization of larger pages by applying a machine learning (ML) model, the ML model being trained based on other static application features and other resource access features of another application and the labeled TLB miss threshold of the runtime feature; and determine the utilization of the larger pages during the runtime based on the TLB miss threshold of the ML model. In this manner, implementations of the invention advantageously provide for an ML model that determines more efficient TLB miss threshold settings during runtime of an application.

In further aspects of this invention, the system further includes program instructions that are executable to: determine the TLB miss threshold based on a TLB hit ratio and real storage cost to a runtime system executing the application. In this manner, implementations of the invention advantageously provide the TLB miss threshold setting with an additional relationship to the real storage cost (i.e., memory utilization) in determining whether larger pages are utilized. In another aspect of this invention, the static application features include data associated with one or more selected from a group consisting of: external functions; programming languages; application size; compiler version; middle ware; database access; application loop count; application branch counts; application call chain counts; input/output resource access; network resource access; number of threads utilized; and heap latch contention. In this manner, implementations of the invention advantageously provide a context for the labeled runtime features thus additional inferences may be made for why a TLB miss count increased/decreased or page-in/page-out count increased/decreased.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
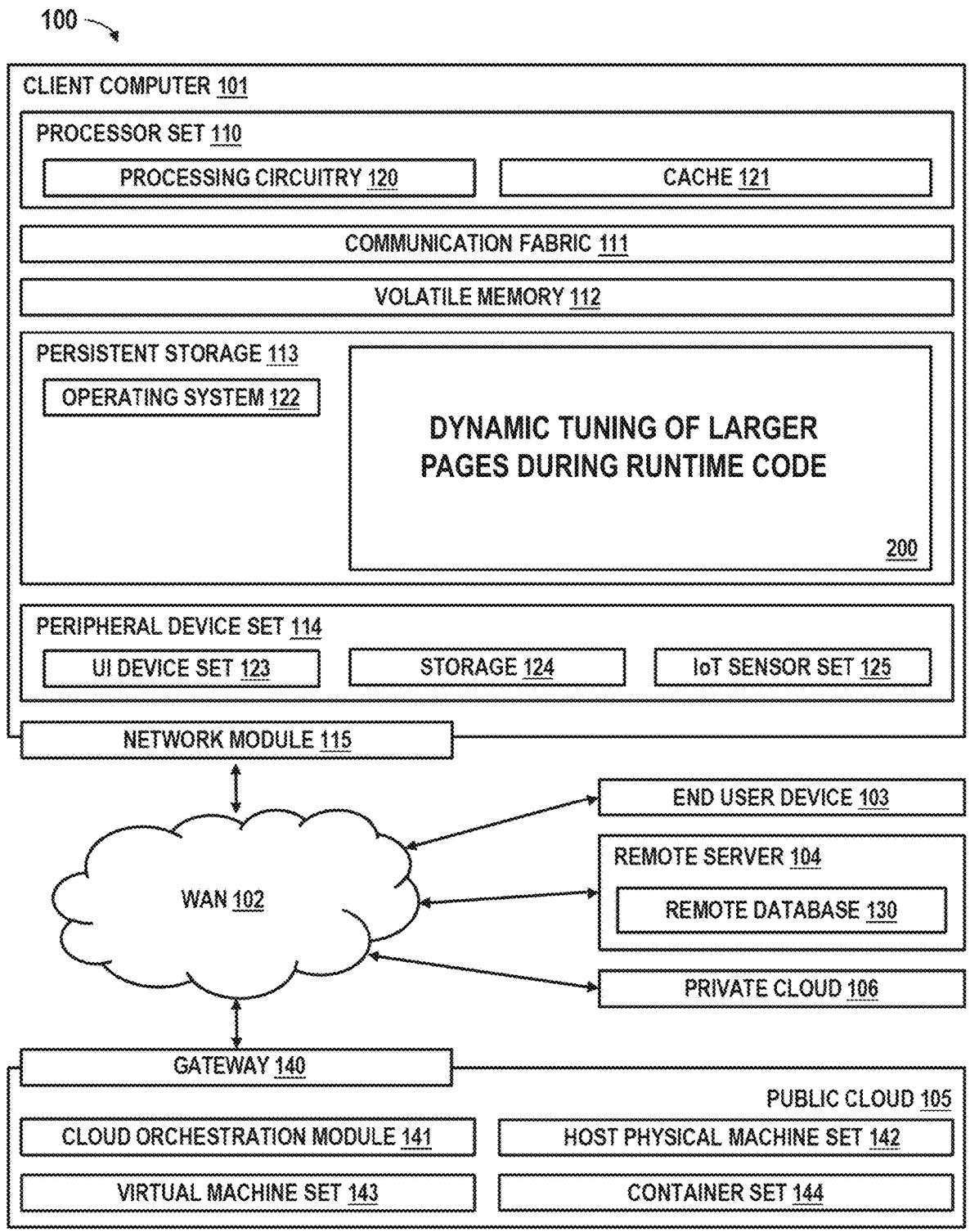
FIG. 1 depicts a computing environment according to an embodiment of the present invention.

Aspects of the present invention relate generally to heap memory management and, more particularly, to dynamic use of larger pages during runtime of applications. In embodiments, a computing device uses machine learning (ML) modeling based on a regression modeling for dynamic tuning of larger pages in heap memory management, thereby accounting for application features and resource access features of the application. In this manner, implementations of the invention provide a method of dynamic utilization of larger pages in heap memory management. The ML modeling may include a regression modeling to help decide a translation lookaside buffer (TLB) miss threshold that should be met before utilization of the larger pages.

In aspects of the invention there is a method for improving overall system performance by dynamically tuning larger page options of a heap during runtime of an application for resolving the translation lookaside buffer (TLB) miss and Operating System (OS) maintenance of larger pages during the runtime. In embodiments, the method includes: using ML modeling based on application features and resource access features for dynamically tuning the large page option of heap during runtime; building auto labeling of runtime features by combining the static application features and runtime features of an application to decide an appropriate TLB miss threshold label; and updating a compiler, a binder, and the runtime collection of application features and resource access features.

Use of larger pages by conventional systems is generally inflexible. Reserved pages can only be used with larger page allocations and must be pre-allocated for application use. As the system ages, there will be many fragments in memory space which require time consuming defragmenting and in some extreme cases this defragmenting fails and thus results in a long latency between a call and return due to accessing large amounts of fragmented memory. Larger pages also may result in memory bloating. Thus, a flexible and dynamic memory mechanisms for utilizing larger pages is needed. Thus, the technical problem with utilization of larger pages lies with the inflexibility of its use. The present invention provides a technical solution to this problem by dynamically setting the TLB miss threshold based on determined utilization of larger pages by an application. In particular the dynamic setting of the TLB miss threshold effects how the memory is managed on the computing device. Specifically, providing a technical improvement to memory management of a computing device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic tuning of larger pages during runtime code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
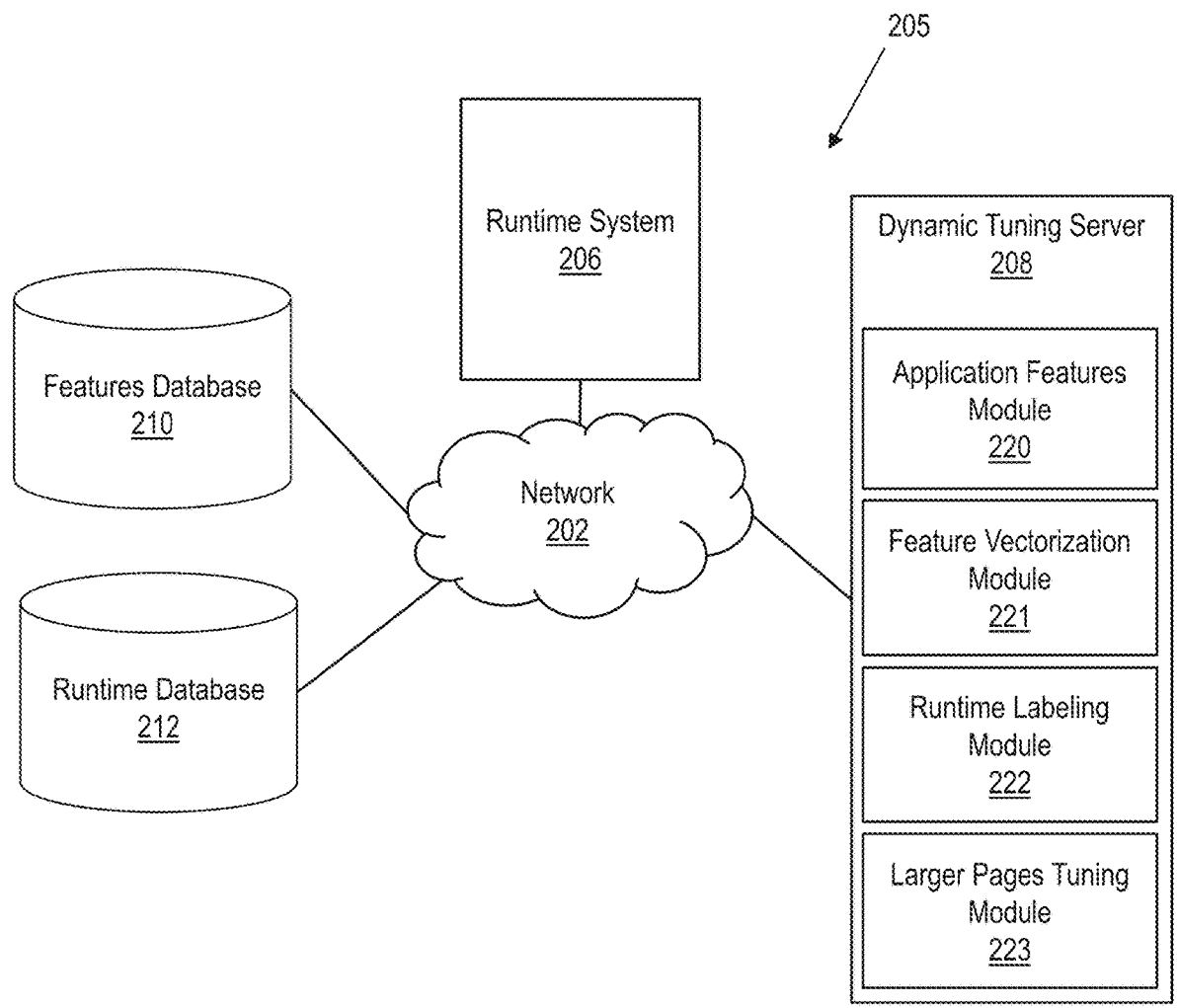
FIG. 2 shows a block diagram of an exemplary environment in accordance with aspects of the invention.

FIG. 2 shows a block diagram of an exemplary environment 205 in accordance with aspects of the invention. In embodiments, the environment 205 includes a network 202 enabling communication between runtime system 206, dynamic tuning server 208, features database 210, and runtime database 212. In one example, the runtime system 206 and dynamic tuning server 208 of FIG. 2 may correspond to the client computer 101 of FIG. 1. In another example, the runtime system 206 may correspond to an end user device 103 of FIG. 1 that runs an application and the dynamic tuning server 208 may correspond to the client computer 101 of FIG. 1.

In embodiments, the code in the dynamic tuning server 208 in FIG. 2 (including program modules in the code) may correspond to the dynamic tuning of larger pages during runtime code 200 of FIG. 1. In one example, the features database 210 and runtime database 212 of FIG. 2 may correspond to the remote database 130 of FIG. 1. In another example, the features database 210 and runtime database 212 may correspond to the storage 124 of FIG. 1. In embodiments, the features database 210 and runtime database 212 may correspond to other storage locations on one or more of the client computer 101, end user device 103, or a remote server 104 of FIG. 1. In embodiments, network 202 of FIG. 2 may correspond to WAN 102 of FIG. 1.

In embodiments, the dynamic tuning server 208 of FIG. 2 comprises an application features module 220, a feature vectorization module 221, a runtime labeling module 222, and a larger pages tuning module 223, each of which may comprise modules of the code of block 200 of FIG. 1. These modules of the code of block 200 are executable by the processing circuitry 120 of FIG. 1 to perform the inventive methods as described herein. The dynamic tuning server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the application features module 220 is configured to collect features associated with applications running on the runtime system 206. In embodiments, collected features may include static application features, resource access features, and runtime features of the application. In exemplary embodiments, the static application features include external functions, programming language, application size, compiler version, middle ware, database access, application loop counts, application branch counts, application call chain counts, input/output (I/O) resource access, network resource access, number of threads utilized, and heap latch contention.

Each of these static application features may include different collection methods. In exemplary embodiments, external function data is collected by updating a binder to accumulate external symbols that count for both static linkages and dynamic linkages. In exemplary embodiments, loop counts, branch counts, and call chain counts are collected by updating a compiler to calculate these loop counts, branch counts, and call chain counts based on a static computation graph. In exemplary embodiments, middle ware and database access data is collected by updating a binder to record specific dynamic link library (DLL) information required when the application accesses middle ware and databases during linking. In exemplary embodiments, I/O resource access data is collected by adding a field at the process-level to record I/O resource accessing by the application and thereby keep track of I/O resource access counts. For example, this I/O resource access count may be tracked by updating fopen( ), fread( ), and fwrite( ) system calls by the application to track I/O access counts. In exemplary embodiments, network resource data is collected by adding a field at the process-level to record network resource accessing by the application. For example, this network resource access may be tracked by updating socket( ), connect( ), and shutdown( ) system calls by the application to track active socket counts. In exemplary embodiments, the number of threads utilized is collected by adding a field at the process-level to save the number of threads that are being utilized in the moment by the application (i.e., thread count). This number of threads specifies the number of simultaneous requests being utilized by the application. For example, this thread count may be tracked by updating pthread_create( ) and pthread_exit( ) system calls to track active thread counts being utilized by the application. In exemplary embodiments, heap latch contention data is collected by adding a field at the process-level to record when a heap latch wait queue is used based on an accumulated number of requests by the application to the heap. For example, this number in the heap latch wait queue may be tracked with an update to malloc( ) system calls, thus returning a count of accumulated requesters of shared resources in the heap.

Further, for resource access features of the application, in exemplary embodiments, the application features module 220 collects a TLB miss count, page-in/page-out count, and real storage usage during runtime of the application. In exemplary embodiments, the TLB utilizes one of the slots in the runtime feature to record the TLB miss count. When the TLB does not contain the information of the page that is attempting to be accessed by the application, the memory management unit (MMU) increments the TLB miss count. In exemplary embodiments, the page-in/page-out count is tracked by incrementing a page-in count when a storage manager reads a page in the system memory from the swap space of the disk (i.e., memory storage device), and a page-out count when a storage manager writes a page into the system memory from the swap space of the disk. In other words, the requested resource is not found in a page table of the heap memory.

In embodiments, the feature vectorization module 221 is configured to vectorize identified features of the application for use in the ML modeling. This vectorization of the identified application features may utilize feature engineering. In exemplary embodiments, the feature engineering utilizes algorithms and encoders to translate each identified and extracted feature into a vectorized form. Any such algorithms or encoders that may provide a vectorized output of the identified application features may be used. The vectorized application features are more easily digestible by ML models, however, in some exemplary embodiments, so no vectorization may be used. Instead, the ML model may analyze the identified application features and based on knowledge about these application features, may interpret the application features to determine a TLB miss threshold.

Figure 6:
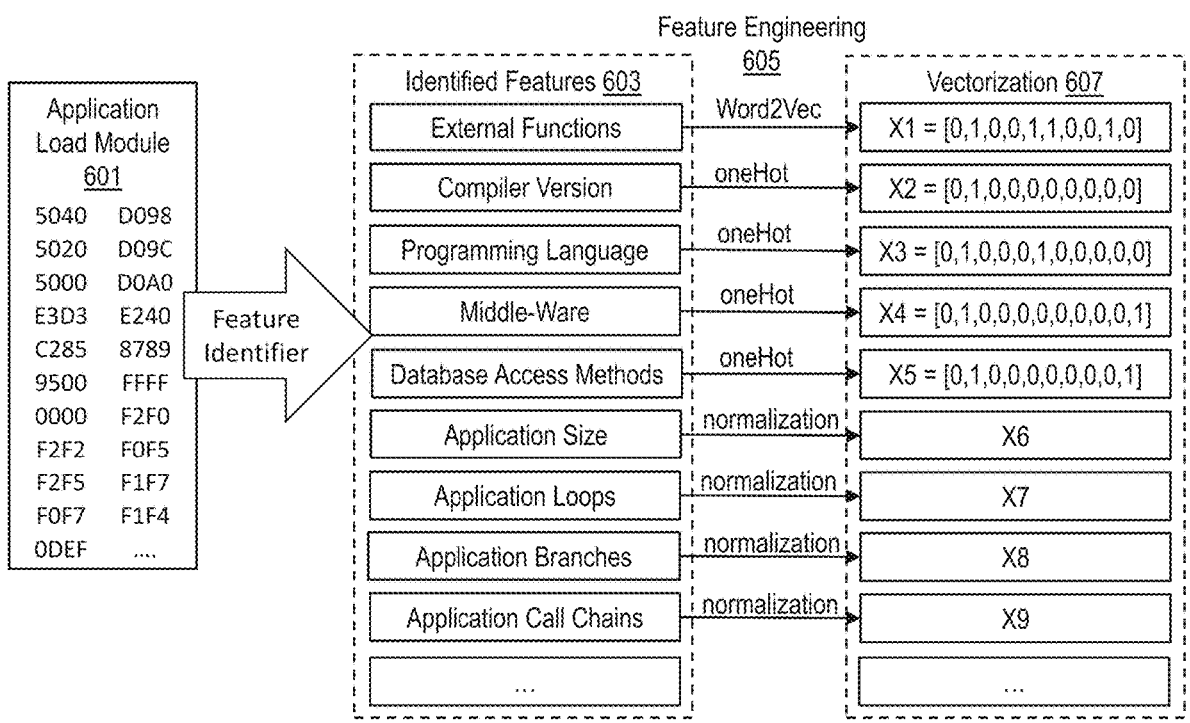
FIG. 6 shows a flowchart showing the vectorization of identified application features of an exemplary method in accordance with aspects of the present invention.

One exemplary embodiment of the vectorization performed by feature vectorization module 221 is shown in the diagram of FIG. 6. For example, application loading module 601 loads the application for analysis by the application features module 220 which identifies application features. These identified features 603, e.g., external functions, compiler version, programming language, middle ware, database access methods, application size, application loops, application branches, and application call chains, are analyzed with feature engineering 605 algorithms and encoders to translate the identified features 603 into a vectorized form (i.e., vectorization) 607. In particular, for example, for external functions of the application with different names, a word2vec algorithm may be utilized. For compiler version data, programming languages data, middle ware data, and data access methods including a one-hot encoding algorithm may be utilized. For application size, loops, branches, and call chain data from the application code, a normalization of the data into vectorized form may be utilized. In embodiments, the application features may indicate different application scenarios that may affect the importance of the application or the need for memory allocation and/or references by the application. For example, web application or online transaction applications may not require as much local access to memory resources and thus may not require use of larger pages. Other examples may include batch applications that provide many requests from the runtime system 206 simultaneously and thus may affect memory allocation and increase the need to access resources of the runtime system 206. This application type information may also be used as a factor in tuning the TLB miss threshold.

Referring back to FIG. 2, in embodiments, the runtime labeling module 222 is configured to collect runtime features during the runtime of the application on runtime system 206. The runtime labeling module 222 also automatically labels the runtime features with TLB miss threshold data. The labels indicating the key runtime history log entry showing where the TLB miss threshold should be set. In other words, the key runtime history log entry indicates the appropriate time to utilize the TLB miss threshold.

Figure 7:
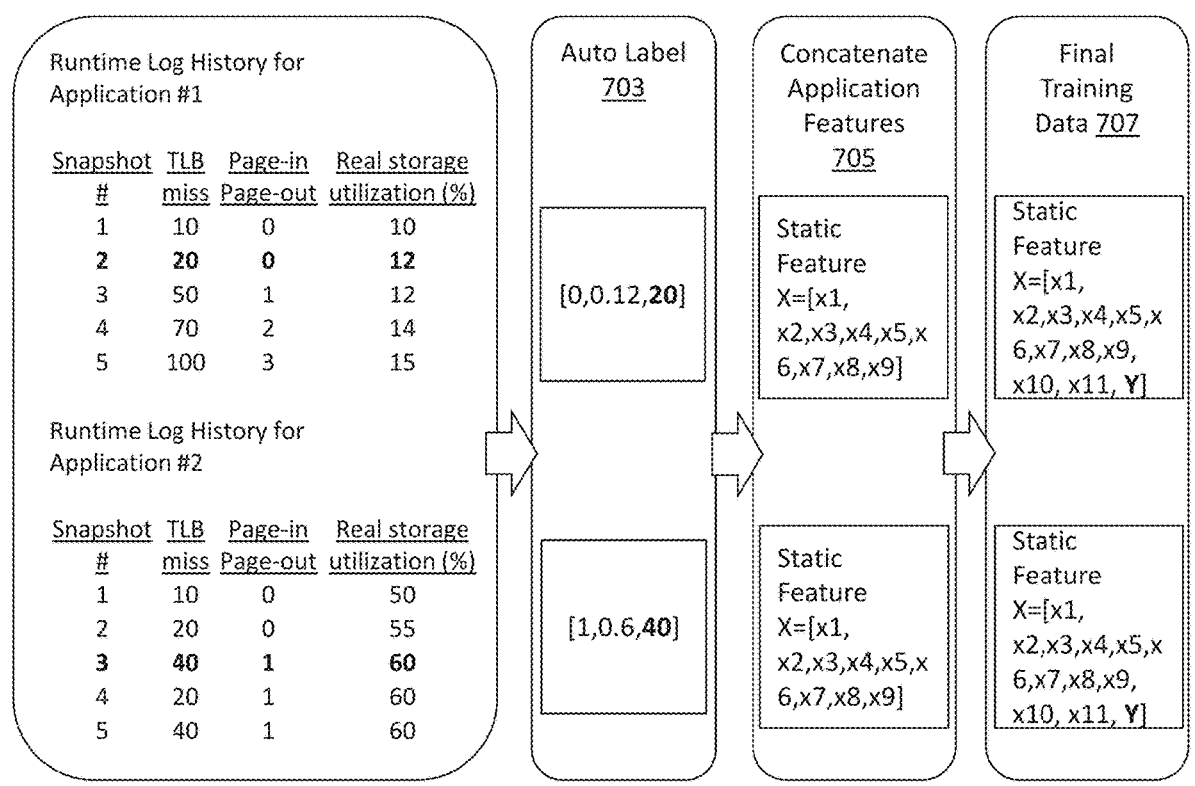
FIG. 7 shows a flowchart showing runtime feature labeling of an exemplary method in accordance with aspects of the present invention.

An exemplary embodiment of this labeling performed by the runtime labeling module 222 is shown in FIG. 7. For example, the runtime history log 701 for application #1 and application #2 are shown. The runtime logs include snapshots of the application during runtime, TLB miss data, Page-in/Page-out data, and real storage utilization percentage. The snapshots may occur at increments of time during runtime of the application, for example, every minute the application is running. The runtime log history is analyzed to determine TLB miss thresholds which are then automatically labeled 703 in a runtime feature. The application features 705 are then concatenated to the labeled runtime feature and used as training data 707 for ML models. As shown in FIG. 7, application #1 indicates a TLB miss threshold should be set at 20 because the TLB miss continues to grow snapshot by snapshot and the first page-in/page-out request is made at snapshot three. Thus, the key TLB miss count occurs after 20 and before 50 so setting the TLB miss threshold at 20 will prevent a resource intensive page-in/page-out request from occurring (and further increasing as shown in snapshots 4 and 5). Also, application #2 indicates a TLB miss threshold should be set at 40 because the TLB miss count drops back to 20 at snapshot 4. Thus, setting the TLB miss threshold to 40 will prevent the TLB miss count from increasing to beyond the point where the TLB miss count again drops. In other words, the TLB miss count will never reach the max point where it will fall again, instead the TLB miss count will stay below that max point where resources are less efficiently utilized.

With continued reference to FIG. 2, in embodiments, the larger pages tuning module 223 is configured to determine a TLB miss threshold that provides the most efficient use of computer resources. In one exemplary embodiment, the larger pages tuning module 223 may utilize ML modeling to determine the TLB miss threshold that is set for the application during runtime (i.e., the runtime option for larger pages). In exemplary embodiments, the larger pages tuning module 223 may train an ML model that determines TLB miss thresholds for an application and applies the ML model to set TLB miss thresholds for when larger pages are utilized (i.e., turning on the use of larger pages) by the application before runtime and/or also dynamically sets the TLB miss threshold when changes occur during the runtime of the application. For example, if the runtime log history begins to indicate that fewer memory resources (i.e., page size does not need to grow) are accessed or the access times for memory resources are reduced (i.e., random and discrete access to memory resources) and real storage is sufficient (e.g., utilization below 80%), then the TLB miss threshold may be increased (i.e., less utilization of larger pages since the system can handle the current requests from the application). If the runtime log history begins to indicate that more memory resources are accessed or needed and real storage is insufficient (e.g., utilization above 80%), then the TLB threshold may be decreased so that larger pages are turned on more often.

Figure 3:
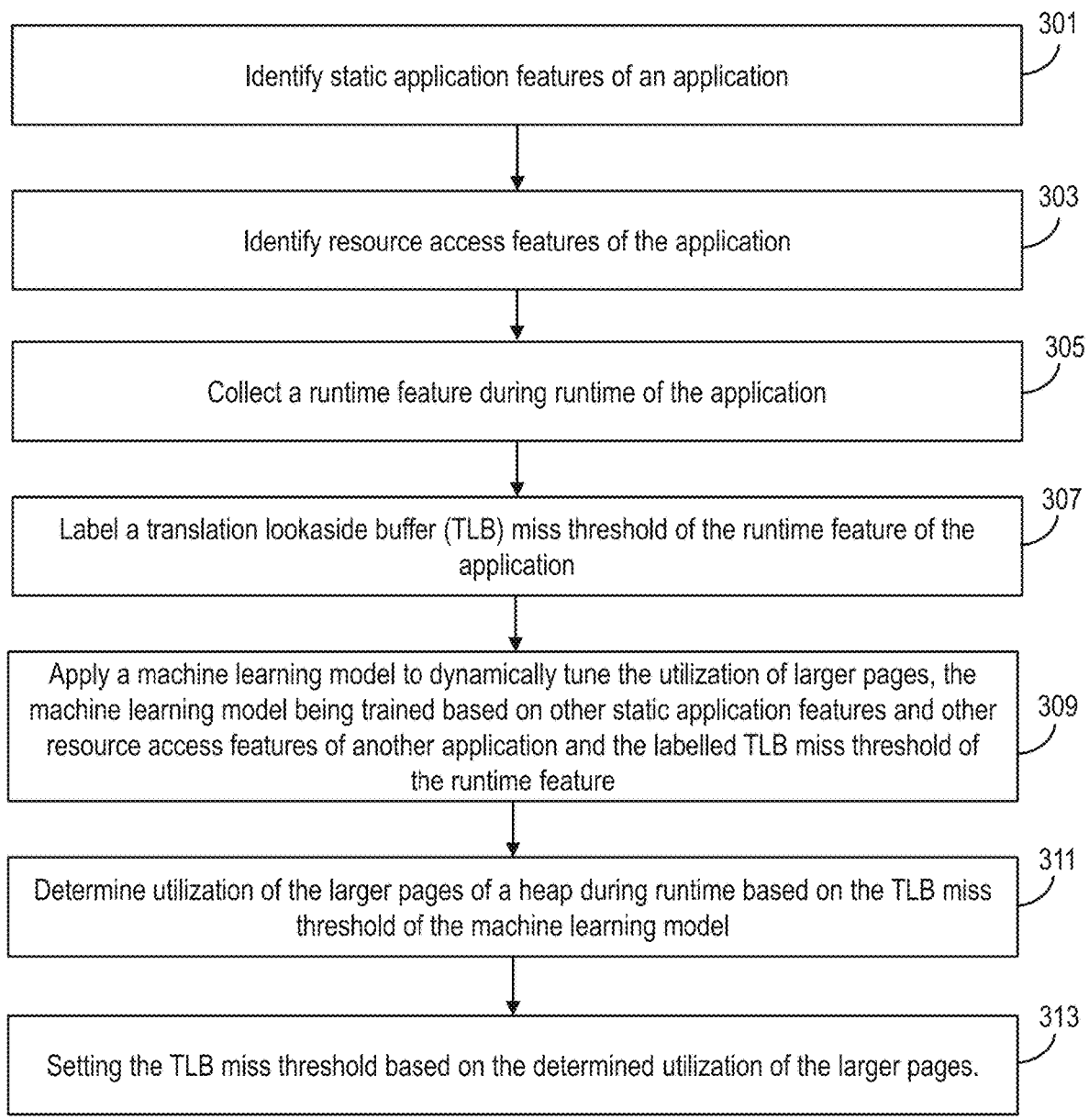
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 301, the dynamic tuning server 208 of FIG. 2 identifies static application features of an application. In embodiments, and as described with respect to FIG. 2, the static application features of the application are identified by the application features module 220. These static application features include external functions of the application, programming language utilized by the application, application size, compiler version of the application, middle ware, database access methods, application loop count, application branch counts, application call chain counts, I/O resource access, network resource access, number of threads, and heap latch contention of the application. The static application features may be identified and collected by updating the compiler, binder, and on a process-level of the application to track and record the static application features. Each of the static features may involve a different recording and/or tracking method.

Figure 4A:
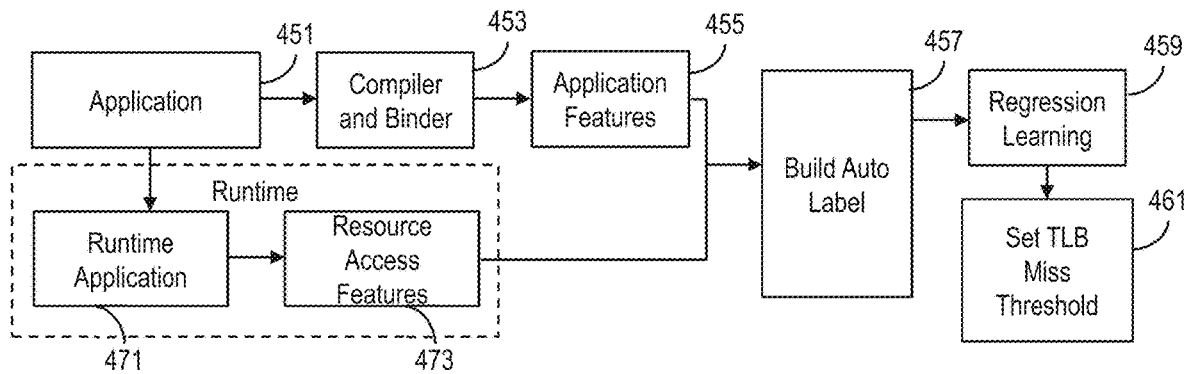
FIG. 4A shows a flowchart of an exemplary machine learning model training method in accordance with aspects of the present invention.
Figure 4B:
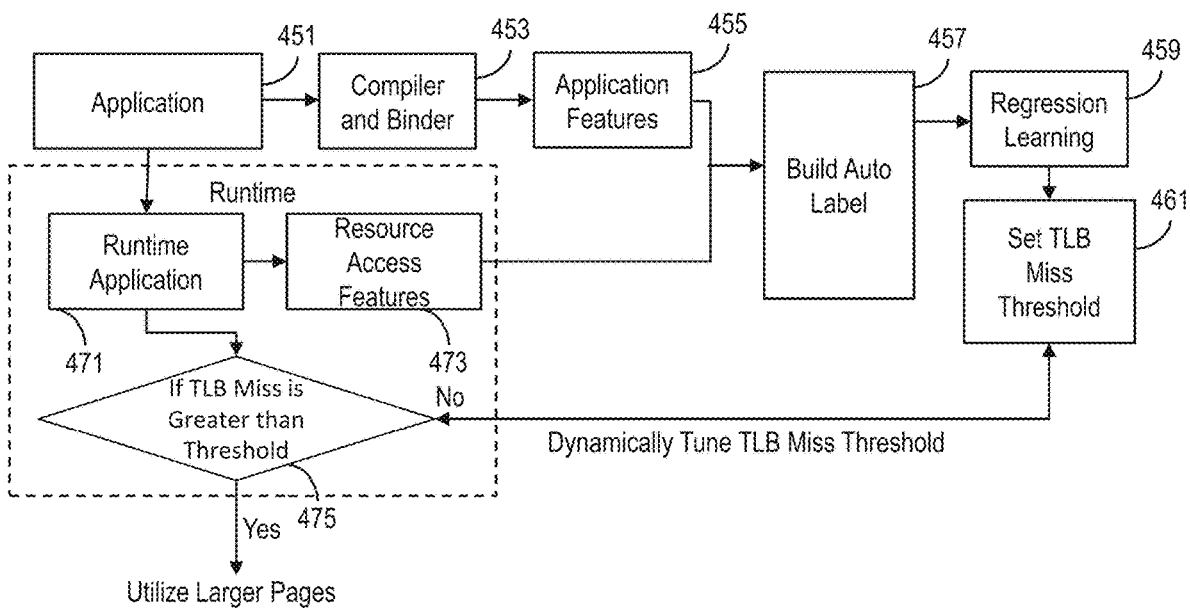
FIG. 4B shows a flowchart of an exemplary machine learning application method in accordance with aspects of the present invention.

At step 303, the dynamic tuning server 208 of FIG. 2 identifies resource access features of the application. In embodiments, and as described with respect to FIG. 2, the application features module 220 may also be used to identify the resource access features of the application. The resource access features may be identified and collected during runtime of the application on the runtime system 206 as seen in FIGS. 4A and 4B. The resource access features may include at least TLB miss counts, but also one or more of a page-in/page-out and real storage utilization percentage of the application.

At step 305, the dynamic tuning server 208 of FIG. 2 collects a runtime feature during runtime of the application. In embodiments, and as described with respect to FIG. 2, the application is executed on the runtime system 206. In exemplary embodiments, the runtime features include a combination of associated resource access features and static application features that represent the application process at a snapshot of the application during runtime. The snapshot may represent the page allocation sequence and TLB miss history of the application process. The runtime features may be auto labeled to indicate a TLB hit ratio (i.e., the number of TLB hits to sum of the number of TLB misses and TLB hits) and real storage cost to the overall runtime system 206. This allows the dynamic tuning server 208 to turn on larger pages early enough to reduce future TLB miss counts, but late enough to decrease real storage costs that do not increase page-in/page-out costs. The label may indicate a TLB miss count that balances the TLB hit ratio and real storage costs. In accordance with aspects of the invention, this auto labeled TLB miss count, at step 307, is an indication of key threshold miss counts that should be used to generate this balanced approach.

At step 309, the dynamic tuning server 208 of FIG. 2 applies an ML model to dynamically tune the utilization of larger pages, the ML model being trained based on other static application features and other resource access features of another application and the labeled TLB miss threshold of the runtime feature. In embodiments, and as described with respect to FIG. 2, the ML model dynamically changes the TLB miss threshold based on workload changes to the runtime system 206 and long-run application storage access style of the application and other applications of the runtime system 206. For example, in an instance where usage of the application progressively decreases, the dynamic tuning server 208 may increase the TLB miss threshold, because there is less of a need to access to heap memory by the application. In another instance, where usage of other applications progressively increases and the application increases, the value of the utilized heap memory increases and thus TLB miss threshold may be decreased to reduce the cost of accessing the heap memory. In embodiments, the trained ML model may include only training data for the application that is being dynamically tuned. This data may require additional runtime of the application to specifically train the ML model, however, could be done in a virtual environment with similar settings as the runtime system 206. In other embodiments, the trained ML model may include training data from another application with similar application features that is executed on a similar runtime system. The ML model may compare these other application features and other runtime systems to determine whether the instant application and runtime system 206 approximates one another, or whether interpolation of the TLB miss thresholds is necessary.

At step 311, the dynamic tuning server 208 of FIG. 2 determines utilization of the larger pages of a heap during runtime based on the TLB miss threshold of the ML model. The ML model being trained with utilization of the TLB miss thresholds by other applications and based on the features and resource utilization of those applications. The ML model may compare the features and resource utilization of these applications to the features and resource utilization of the application in question in addition to the labelled TLB miss thresholds to dynamically set the TLB miss threshold. Based on this setting of the TLB miss threshold, a determination of when larger pages should be utilized is made. In embodiments, and as described with respect to FIG. 2, the TLB miss threshold may be increased when the page access by the application is random and discrete, and real storage is sufficient. Therefore, for applications with transaction style workloads, TLB miss thresholds are set higher to prevent larger pages from being utilized and wasting memory when the application access is unneeded. In embodiments, the TLB miss threshold is reduced when page access frequency and concentration is insufficient. Therefore, the dynamic tuning server 208 is useful for applications which use an in-memory database, require large amounts of memory access, and low locality of reference access to the same set of memory locations. In these instances, TLB miss thresholds should be set smaller to turn larger pages on earlier for more efficient performance. In exemplary embodiments, a runtime option is added to application execution in order to control whether heap memory is allocated on larger page backed memory or not.

At step 313, the dynamic tuning server 208 of FIG. 2 sets the TLB miss threshold based on the determined utilization of the larger pages. In embodiments, and as described with respect to FIG. 2, the setting of the TLB miss threshold provides a basis for turning on larger pages. The TLB miss threshold is used in determinations of when larger pages are utilized. In other words, the TLB miss threshold is set based on when the dynamic tuning server 208 should begin utilizing larger pages. For example, once the TLB miss count exceeds the TLB miss threshold, larger pages are turned on. In exemplary embodiments, the TLB miss threshold is set to the labeled TLB miss count since the labeled TLB miss count indicates a TLB miss count that balanced TLB hit ratio and real storage costs. In exemplary embodiments, the TLB miss threshold may also be interpolated using the ML model.

FIG. 4A shows a flowchart of an exemplary ML model training method in accordance with aspects of the present invention. Steps of the method may be carried out in the environment of FIG. 2 and are described with reference to elements depicted in FIG. 2. As described throughout, the application 451 is the application that will benefit from the dynamic management of larger pages with better memory management. The application 451 is passed to an updated compiler and binder 453 to extract application features 455. The application 451 is also executed in runtime system 206 to further collect data regarding the application during runtime. The runtime application 471 provides process-level features of the application 451 and may allow of the identification and collection of resource access features 473. These application features 455 and resource access features 473 may be utilized for building auto labeling 457 of TLB miss thresholds during runtime of the application for training of ML models including regression learning modeling

459. The ML models are then used to determine and set TLB miss thresholds 461 for similar applications and/or the same application. In exemplary embodiments, the regression learning model may be a linear regression model.

FIG. 4B shows a flowchart of an exemplary ML model application method in accordance with aspects of the present invention. Steps of the method may be carried out in the environment of FIG. 2 and are described with reference to elements depicted in FIG. 2. Similar to FIG. 4A, the same steps are present, except that in FIG. 4B once the TLB miss threshold is set 461, the TLB miss threshold for the runtime application 471 may be dynamically tuned. A determination is made of whether the TLB miss count is greater than the TLB miss threshold. If yes, larger pages runtime option is utilized in heap memory management. If no, the TLB miss threshold may remain the same or be increased as further determinations and analysis may indicate that the application usage has changed and/or other application usage has changed (affecting the importance of the application).

Figure 5A:
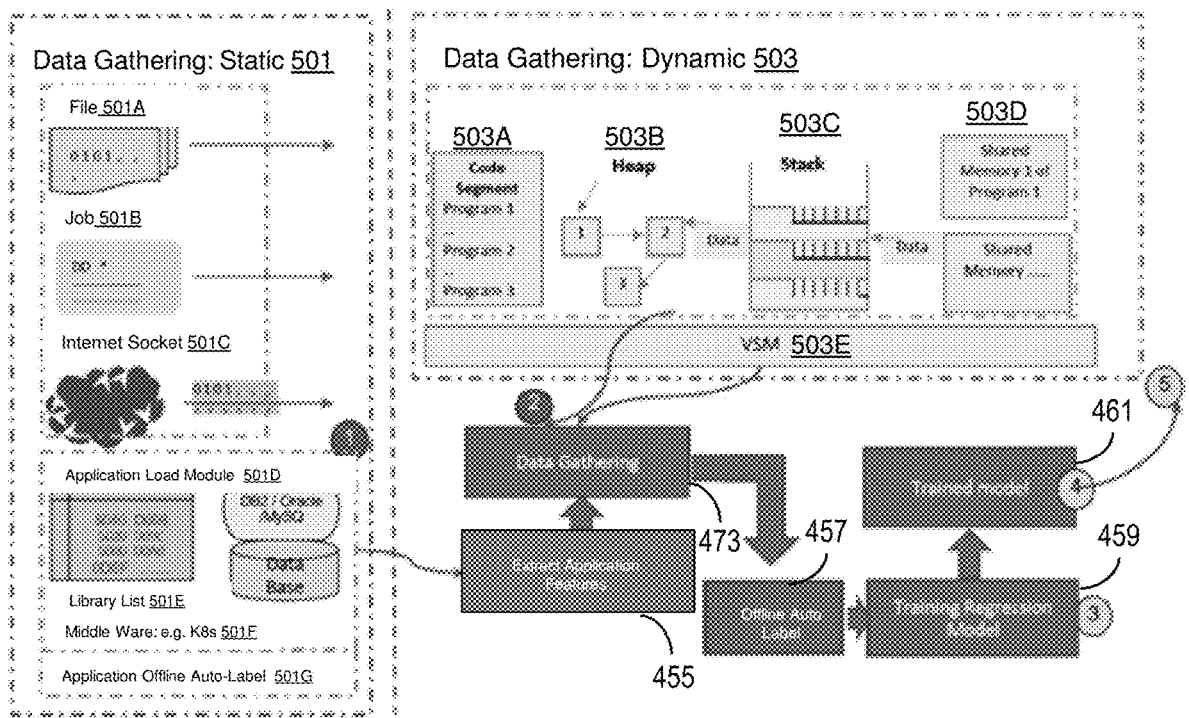
FIG. 5A shows a flowchart of an exemplary machine learning model training method in accordance with aspects of the present invention.

FIG. 5A shows a flowchart of an exemplary machine learning model training method in accordance with aspects of the present invention. Similar to FIG. 4A, FIG. 5A shows further the system environment from which the extracted static application features 455 are gathered. In an exemplary embodiment, the system environment (noted as data gathering: static 501) for extracting the static application features 455 includes gathering application features from data associated with files of the application 501A, jobs of the application 501B, internet socket communications information associated with the application 501C, an application load module 501D and any associated data including data from a library list 501E and any middle ware 501F being used, and application offline auto labeling 501G. The offline auto labeling 501G may include any previous labeling done for static application features in relation to runtime features including at least a TLB miss count, page-in/page-out, and/or real storage utilization. As described in FIG. 4A, in exemplary embodiments, a compiler and binder 453 are updated to gather these application features 455 from the system environment.

In embodiments, once these static application features have been extracted, runtime data associated with the application is gathered dynamically as represented by "data gathering: dynamic 503". During runtime, the memory representations of the application include data from code segments 503A of the application, heap usage of the application 503B, stack usage of the application 503C, and shared memory utilization 503D by different programs (i.e., applications). In exemplary embodiments, a virtual storage manager (VSM) 503E may be utilized to gather the data 473 from these runtime memory representations. The VSM manages storage allocation and responds to request to obtain free virtual storage, thereby placing the VSM in the best position to gather data associated with runtime memory representation of the application. The extracted application features 455 and gathered data 473 from runtime contributes to the labeling by offline building auto label 457 to indicate key TLB miss counts during runtime and the use a concatenated application feature and labeled runtime feature to train an ML model including regression modeling 459. The trained ML model can then be used to determine utilization of large pages by setting the TLB miss thresholds to the labeled TLB miss counts. This labeling may occur automatically without the application being in runtime at the moment of labeling, i.e., offline, by analyzing a runtime history log with runtime features to identify label locations and times (i.e., the TLB miss count and when the TLB miss count occurred). In exemplary embodiments, the trained ML model 461 is used to predict TLB miss thresholds. These predicted TLB miss thresholds may be for the application that the training data is taken from, or for other applications being executed on the system. In any event, the trained ML model 461 setting of the TLB miss threshold establishes when larger pages are used.

Figure 5B:
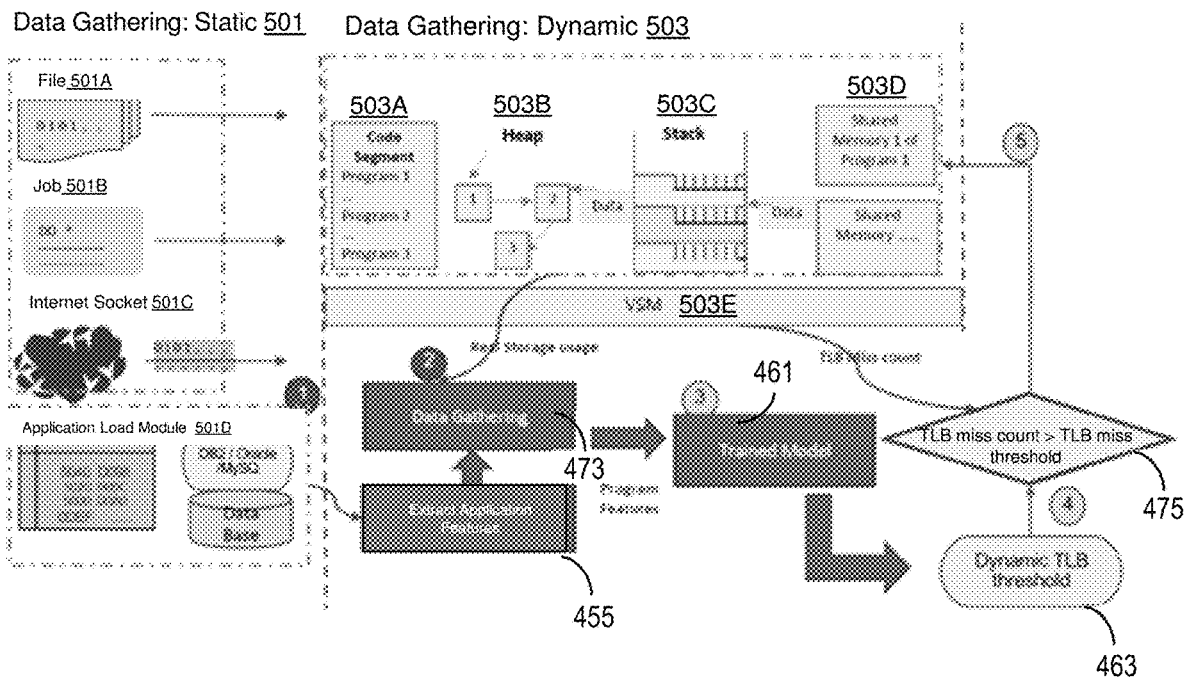
FIG. 5B shows a flowchart of an exemplary machine learning application method in accordance with aspects of the present invention.

FIG. 5B shows a flowchart of an exemplary machine learning application method in accordance with aspects of the present invention. Similar to FIG. 4B, FIG. 5B shows further the same system environment from which the extracted static application features 455 and dynamic resource access features 473 are gathered. Further, FIG. 5B includes the use of a trained ML model 461. The trained ML model 461 may be utilized to determine a TLB miss threshold dynamically. As changes occur during runtime, the trained ML model 461 may dynamically tune (i.e., set) the TLB miss threshold 463 based on the modeling by the ML model 461. The ML model 461 may utilize newly gathered data during runtime that results in different TLB miss thresholds. For example, when more applications are used simultaneously, memory utilization goes up and the ML model 461 may lower the TLB miss threshold so that larger pages are used thereby making memory utilization more efficient. In exemplary embodiments, a decision 475 is made once a TLB miss threshold is set to, during runtime of the application, determine whether TLB miss count exceeds the TLB miss threshold, if the TLB miss threshold is met larger pages are utilized.

Figure 5C:
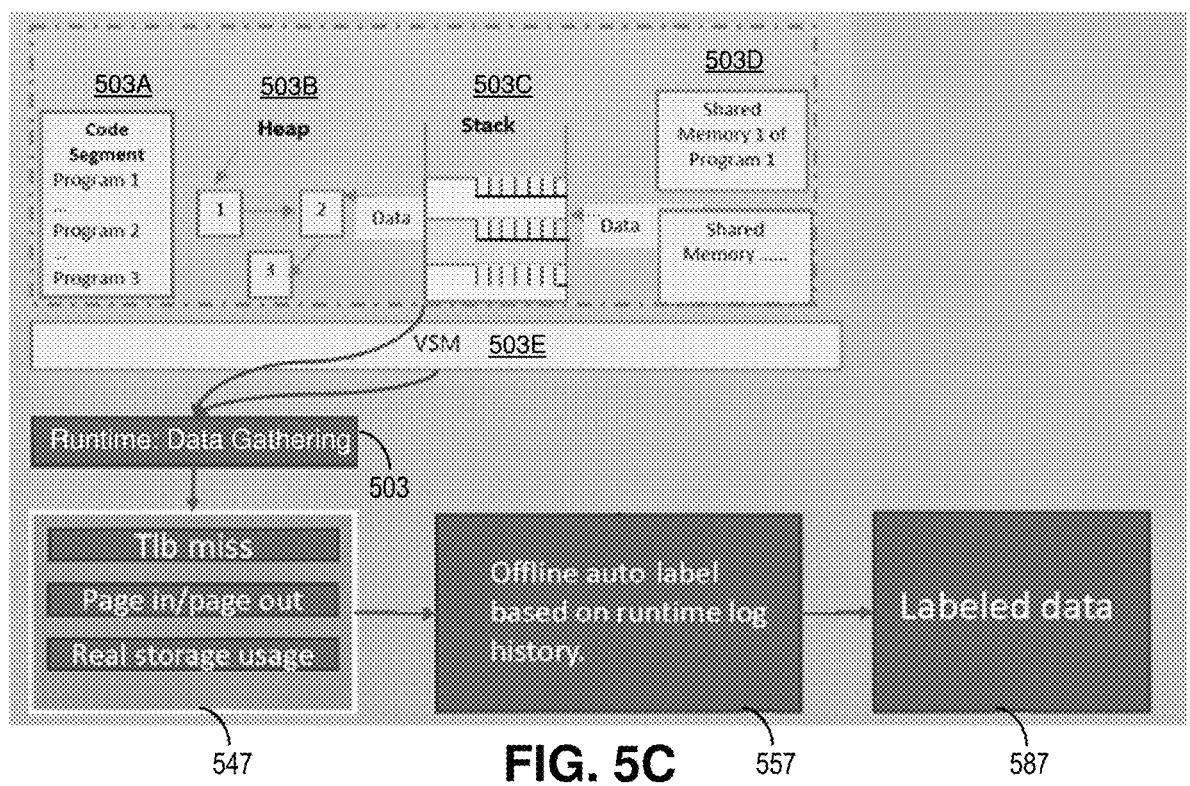
FIG. 5C shows a flowchart of an exemplary runtime feature labeling method in accordance with aspects of the present invention.

FIG. 5C shows a flowchart of an exemplary runtime feature labeling method in accordance with aspects of the present invention. In exemplary embodiments, this labeling method may be executed as described in FIGS. 4A and 4B as building auto label 457. In exemplary embodiments, the runtime features are gathered from memory representations of the application 503. These runtime features 547 may include TLB miss counts, page-in/page-out data, and real storage use (i.e., utilization). In exemplary embodiments, these runtime features 547 are auto labeled 557 to indicate key TLB miss counts and this labeled runtime feature may be concatenated with associated static application features to generate the labeled data 587. In exemplary embodiments, the labeled data 587 is then passed to the ML model 459 of FIG. 5A for training.

FIG. 6 shows a flowchart showing the vectorization of identified application features of an exemplary method in accordance with aspects of the present invention. Steps of the method may be carried out in the environment of FIG. 2 and are described with reference to elements depicted in FIG. 2. In embodiments, the feature vectorization module 221 of FIG. 2 may be utilized to process each of the steps in the vectorization flowchart. The application load module 601 loads the application for analysis by the application features module 420 which identifies application features. The identified features 603 are then analyzed and encoded with feature engineering 605 to output a vectorized form 607 of the identified features 603. In embodiments, this vectorized form 607 is data that is easily digestible by a ML model.

FIG. 7 shows a flowchart showing runtime feature labeling of an exemplary method in accordance with aspects of the present invention. Steps of the method may be carried out in the environment of FIG. 2 and are described with reference to elements depicted in FIG. 2. In embodiments, the runtime labeling module 222 of FIG. 2 may be utilized to process each of the steps in the runtime feature labeling flowchart. A runtime history log 701 of runtime features including snapshots of the application during a runtime is analyzed. An analysis of the runtime history log 701 is made to determine key TLB miss counts that should be labeled. The key TLB miss count (and associated runtime feature) is auto labeled 703 to identify the appropriate setting for the TLB miss threshold (i.e., the key TLB miss count), why the TLB miss count was selected, and the static application features which may have affected the TLB miss threshold. These static application features are concatenated 705 to the auto labeled runtime features 703 to provide as training data 707 for ML models. This provides an indication of the context for the runtime feature (e.g., the static application feature being used), the key TLB miss count (e.g., the labeled TLB miss threshold), and potentially why the TLB miss count was determined to be the TLB miss threshold.

In FIG. 7, the bold-faced typed portions a runtime snapshot, auto labeled TLB miss count, and 'Y' in the training data vector that describe the log history and what types of snapshots would be auto-labeled. For example, under the log history for application #1, snapshot 2 indicates the TLB miss threshold that should be set. As shown in this example, snapshot 2 is before the page-in/page-out occurs. Thus, a TLB miss threshold of 20 is auto-labeled and added to the vectorized data for training the ML model.

In the second example, under the log history for application #2, snapshot 3 indicates the TLB miss threshold that should be set. As shown in this example, snapshot 3 is when the TLB miss occurrence drops again from 40 to 20 (in snapshot 4). Thus, a TLB miss threshold of 40 is auto-labeled and added to the vectorized data for training the ML model.

In embodiments, the advantages to the dynamic tuning of larger pages may include less memory waste and improved performance of the runtime system. By utilizing larger pages when needed, memory consumption is minimal and performance is increased when needed at appropriate times. Further, dynamically tuning larger pages avoids the need for experienced users and system administrator interference to initiate the larger pages runtime option.

In embodiments, a service provider could offer to perform the processes described herein. In this case, the service provider can create, maintain, deploy, support, etc., the computer infrastructure that performs the process steps of the invention for one or more customers. These customers may be, for example, any business that uses applications that heap memory management during runtime of the application. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    collecting, by a processor set, a plurality of runtime features including a translation lookaside buffer (TLB) miss count, page-in/page-out data, and real storage utilization during a runtime of an application;
    labeling, by the processor set, a TLB miss threshold which balances a TLB hit ratio and real storage costs of the runtime features of the application;
    determining, by the processor set, utilization of larger pages during the runtime based on the TLB miss threshold; and
    setting, by the processor set, the TLB miss threshold based on the determined utilization of the larger pages.

2. The method of claim 1, further comprising:
    determining the TLB miss threshold using a machine learning (ML) model; and
    dynamically tuning the utilization of the larger pages using the TLB miss threshold, the ML model being trained based on static application features and resource access features of another application.

3. The method of claim 2, wherein the ML model includes a regression learning model.

4. The method of claim 2, further comprising:
    training the ML model based on labeled TLB miss thresholds.

5. The method of claim 2, further comprising:
    identifying static application features of the application;
    vectorizing the static application features; and
    training the ML model with the vectorized static application features.

6. The method of claim 5, wherein the vectorized static application features are included in a runtime log history including the runtime features.

7. The method of claim 1, further comprising:
    identifying static application features from the runtime features of the application; and
    wherein the labeling is further based on the static application features and resource access features from the runtime features of the application.

8. The method of claim 7, further comprising:
    collecting the static application features from a compiler and/or a binder.

9. The method of claim 7, wherein the resource access features include the TLB miss count and a page-in/page-out count.

10. The method of claim 7, wherein the static application features include data associated with one or more selected from a group consisting of:
    external functions;
    programming languages;
    application size;
    compiler version;
    middle ware;
    database access;
    application loop count;
    application branch counts;
    application call chain counts;

input/output resource access;
network resource access;
number of threads; and
heap latch contention.

11. The method of claim 1, further comprising training a machine learning (ML) model based on first training data for the application and second training data for another application with same features as the application and being executed on a same runtime system as the application, wherein the TLB miss threshold increases when page access by the application is inconsistent and/or when real storage space is sufficient.

12. The method of claim 1, further comprising:
determining the TLB miss threshold based on the TLB hit ratio and the real storage cost to a runtime system executing the application,
wherein the setting the TLB miss threshold based on the determined utilization of the larger pages further comprises increasing the TLB miss threshold based on low utilization of the larger pages, and
the setting the TLB miss threshold based on the determined utilization of the larger pages further comprises decreasing the TLB miss threshold based on high utilization of the larger pages.

13. A computer program product comprising one or more computer readable storage media having program instructions collectively stored on the one or more computer readable storage media, the program instructions executable to:
identify static application features of an application;
identify resource access features of the application;
collect a plurality of runtime features including a translation lookaside buffer (TLB) miss count, page-in/page-out data, and real storage utilization during runtime of the application;
label a TLB miss threshold which balances a TLB hit ratio and real storage costs of the runtime features of the application; and
determine utilization of larger pages during the runtime by training a machine learning (ML) model based on the labeled TLB miss threshold, the static application features, and the resource access features.

14. The computer program product of claim 13, wherein the program instructions are executable to:
dynamically tune the utilization of the larger pages by applying the ML model.

15. The computer program product of claim 13, wherein the program instructions are further executable to:
set the TLB miss threshold based on the determined utilization of the larger pages, the setting the TLB miss threshold based on the determined utilization of the larger pages further comprises increasing the TLB miss threshold based on low utilization of the larger pages and decreasing the TLB miss threshold based on high utilization of the larger pages, wherein the ML model includes a regression learning model.

16. The computer program product of claim 13, wherein the program instructions are executable to:
vectorize the static application features; and
train the ML model with the vectorized static application features.

17. A system comprising:
a processor set, one or more computer readable storage media, and program instructions collectively stored on the one or more computer readable storage media, the program instructions executable to:
identify static application features of an application;
identify resource access features of the application;
collect a plurality of runtime features including a translation lookaside buffer (TLB) miss count, page-in/page-out data, and real storage utilization during runtime of the application;
label a TLB miss threshold which balances a TLB hit ratio and real storage costs of the runtime features of the application;
dynamically tune utilization of larger pages by applying a machine learning (ML) model, the ML model being trained based on other static application features and other resource access features of another application and the labeled TLB miss threshold of the runtime feature; and
determine the utilization of the larger pages during the runtime based on the TLB miss threshold of the ML model.

18. The system of claim 17, wherein the program instructions are executable to:
set the TLB miss threshold based on the determined utilization of the larger pages, the setting the TLB miss threshold based on the determined utilization of the larger pages further comprises increasing the TLB miss threshold based on low utilization of the larger pages and decreasing the TLB miss threshold based on high utilization of the larger pages, and the program instructions are further executable to:
training the ML model based on labeled TLB miss thresholds of another application.

19. The system of claim 17, wherein the static application features include data associated with one or more selected from a group consisting of:
external functions;
programming languages;
application size;
compiler version;
middle ware;
database access;
application loop count;
application branch counts;
application call chain counts;
input/output resource access;
network resource access;
number of threads; and
heap latch contention.

20. The system of claim 17, wherein the program instructions are executable to:
determine the TLB miss threshold based on the TLB hit ratio and the real storage cost to a runtime system executing the application.

* * * * *